US009619726B2

United States Patent
Inaba et al.

(10) Patent No.: US 9,619,726 B2
(45) Date of Patent: Apr. 11, 2017

(54) INFORMATION INPUT DEVICE

(71) Applicant: Brother Kogyo Kabushiki Kaisha, Nagoya-shi, Aichi-ken (JP)

(72) Inventors: Takehiko Inaba, Chita-gun (JP); Atsushi Kasugai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 86 days.

(21) Appl. No.: 14/807,980

(22) Filed: Jul. 24, 2015

(65) Prior Publication Data
US 2016/0026273 A1    Jan. 28, 2016

(30) Foreign Application Priority Data

Jul. 24, 2014 (JP) ................. 2014-150530

(51) Int. Cl.
| G06F 3/041 | (2006.01) |
| G06K 9/22 | (2006.01) |
| G06F 15/02 | (2006.01) |
| G06F 1/16 | (2006.01) |
| G06F 3/046 | (2006.01) |

(52) U.S. Cl.
CPC .......... *G06K 9/222* (2013.01); *G06F 1/1616* (2013.01); *G06F 1/1618* (2013.01); *G06F 1/1643* (2013.01); *G06F 15/0283* (2013.01); *G06F 15/0291* (2013.01); *G06F 3/046* (2013.01)

(58) Field of Classification Search
CPC ............ G06F 15/0283; G06F 15/0291; G06F 1/1616; G06F 1/1618; G06F 1/1643; G06F 3/046; G06K 9/222
See application file for complete search history.

(56) References Cited

U.S. PATENT DOCUMENTS

| 2004/0049743 A1* | 3/2004 | Bogward ................ G06F 1/162 715/262 |
| 2013/0076597 A1* | 3/2013 | Becze ................... G06F 3/1438 345/1.3 |
| 2014/0042227 A1 | 2/2014 | Inaba |

FOREIGN PATENT DOCUMENTS

| JP | 2000-294314 A | 10/2000 |
| JP | 2005-116288 A | 4/2005 |
| JP | 2014-036250 A | 2/2014 |

* cited by examiner

*Primary Examiner* — Kumar Patel
*Assistant Examiner* — Insa Sadio
(74) *Attorney, Agent, or Firm* — Banner & Witcoff, Ltd.

(57) ABSTRACT

An information input device includes a first detection device, a second detection device, a coupling member, a connecting line, and a protective member. The coupling member includes a fixing portion and a holding portion, and a folding portion. The connecting line includes an intermediate portion connecting the first detection device and the second detection device that detect a position of the writing tool. At least a part of the intermediate portion extends between the first detection device and the second detection device and is arranged to face the folding portion. The protective member includes an arrangement portion whose length is longer than a length of the intermediate portion. An end portion of the protective member is fixed to at least one of the fixing portion and the holding portion. The arrangement portion is disposed between the folding portion and the intermediate portion of the connecting line.

10 Claims, 7 Drawing Sheets

INFORMATION INPUT DEVICE

CROSS-REFERENCE TO RELATED APPLICATION

This application claims priority to Japanese Patent Application No. 2014-150530 filed Jul. 24, 2014, the content of which is hereby incorporated herein by reference.

BACKGROUND

The present disclosure relates to an information input device that can acquire information input on a booklet-like recording medium in which a plurality of paper sheets are bound.

An information input device is known that can digitize information that is written on a recording medium, such as paper. A digitizer that is incorporated into the information input device acquires coordinates of a position of a special electronic pen that comes close to it. When writing is performed using the electronic pen on the recording medium placed on a detection surface of the digitizer, the information input device can read hand-written content and digitize the content as coordinate data.

When a booklet-like recording medium in which a plurality of paper sheets are bound, such as a notebook, is mounted on the information input device, there is a case in which it is desired to read information that has been written, using the electronic pen, on two pages in a spread state. As a structure of the information input device that is used in this type of case, a structure is conceivable in which a pair of digitizers are coupled. The pair of digitizers are electrically connected to each other by a connecting line, and back surfaces on an opposite side to detection surfaces are covered by a cover. When the information input device is carried around, the cover is folded in a direction in which the detection surfaces of the digitizers face each other. Thus, the notebook is closed and the information input device can be in a folded over state. Generally, the connecting line is provided along an inner surface of the cover, and has a bending portion that bends in accordance with the folding of the cover. Since the digitizers have a thickness, the radius of curvature of the curve of the connecting line is relatively large at the bending portion.

SUMMARY

However, there is a case in which the above-described information input device is used in a state in which a report pad, for example, is mounted on only one of the digitizers. In this case, there is a possibility that the information input device is used in a state in which the cover is folded in a direction in which the back surfaces of the digitizers face each other. The radius of curvature of the curve at the bending portion of the connecting line is smaller than that when the cover is folded in the direction in which the detection surfaces face each other. Therefore, there is a possibility of breakage of the connecting line and disconnection etc. of a conductive path.

It is an object of the present disclosure to provide an information input device that can protect a connecting line regardless of a bending direction of a folding portion.

According to an aspect of the present disclosure, an information input device is capable of acquiring information that is input using a writing tool on a booklet-like recording medium in which a pair of cover sheets and a plurality of paper sheets that are stacked and arranged between the pair of cover sheets are bound at a part of respective edge portions thereof. And the information input device includes a first detection device, a second detection device, a coupling member, a connecting line, and a protective member. The first detection device has a first detection surface and a first circuit portion. And the first detection device is a plate-shaped body capable of detecting a position of the writing tool that approaches the first detection surface. The first detection device is capable of being arranged to face an entire surface of a first cover sheet of the pair of cover sheets. The second detection device has a second detection surface and a second circuit portion. The second detection device is a plate-shaped body capable of detecting a position of the writing tool that approaches the second detection surface. The second detection device is capable of being arranged to face an entire surface of a second cover sheet of the pair of cover sheets. The coupling member couples the first detection device and the second detection device. And the coupling member includes a fixing portion, a holding portion, and a folding portion. The fixing portion is arranged to face a first back surface and fixes the first detection device. The first back surface is a surface on an opposite side to the first detection surface of the first detection device. The holding portion is arranged to face a second back surface. And the holding portion holds the second detection device such that the second detection device is capable of moving in a direction in which the second detection device approaches the first detection device and in a direction in which the second detection device separates from the first detection device. The second back surface is a surface on an opposite side to the second detection surface of the second detection device. The folding portion couples the fixing portion and the holding portion. And the folding portion is capable of being folded in one direction and another direction. The one direction is a direction in which the first detection surface and the second detection surface face each other. The other direction is a direction in which the first back surface and the second back surface face each other. A connecting line includes a plurality of conductive paths formed on a flexible insulating film. And the connecting line electrically connects the first circuit portion and the second circuit portion. The connecting line includes a first connecting portion, an intermediate portion, and a second connecting portion. The first connecting portion includes a first terminal portion that electrically connects to the first circuit portion. At least a part of the first connecting portion is disposed between the first back surface and the fixing portion. The intermediate portion connects to the first connecting portion. At least a part of the intermediate portion extends between the first detection device and the second detection device and is arranged to face the folding portion. The second connecting portion connects to the intermediate portion. And the second connecting portion includes a second terminal portion that electrically connects to the second circuit portion. At least a part of the second connecting portion is disposed between the second back surface and the holding portion. A protective member is a flexible sheet-like member and an end portion of the protective member is fixed to at least one of the fixing portion and the holding portion of the coupling member. The protective member has an arrangement portion whose length is longer than a length of the intermediate portion in a second direction. The second direction intersects a first direction in which the intermediate portion extends between the first detection device and the second detection device. The arrangement portion is disposed between the folding portion and the intermediate portion of the connecting line.

BRIEF DESCRIPTION OF THE DRAWINGS

Embodiments will be described below in detail with reference to the accompanying drawings in which.

DETAILED DESCRIPTION

Hereinafter, embodiments of the present disclosure will be explained with reference to the drawings. The drawings referred to are used to explain technological features that can be adopted by the present disclosure. Device configurations etc. shown in the drawings are merely explanatory examples and are not intended to limit the present disclosure to only those examples.

Figure 1:
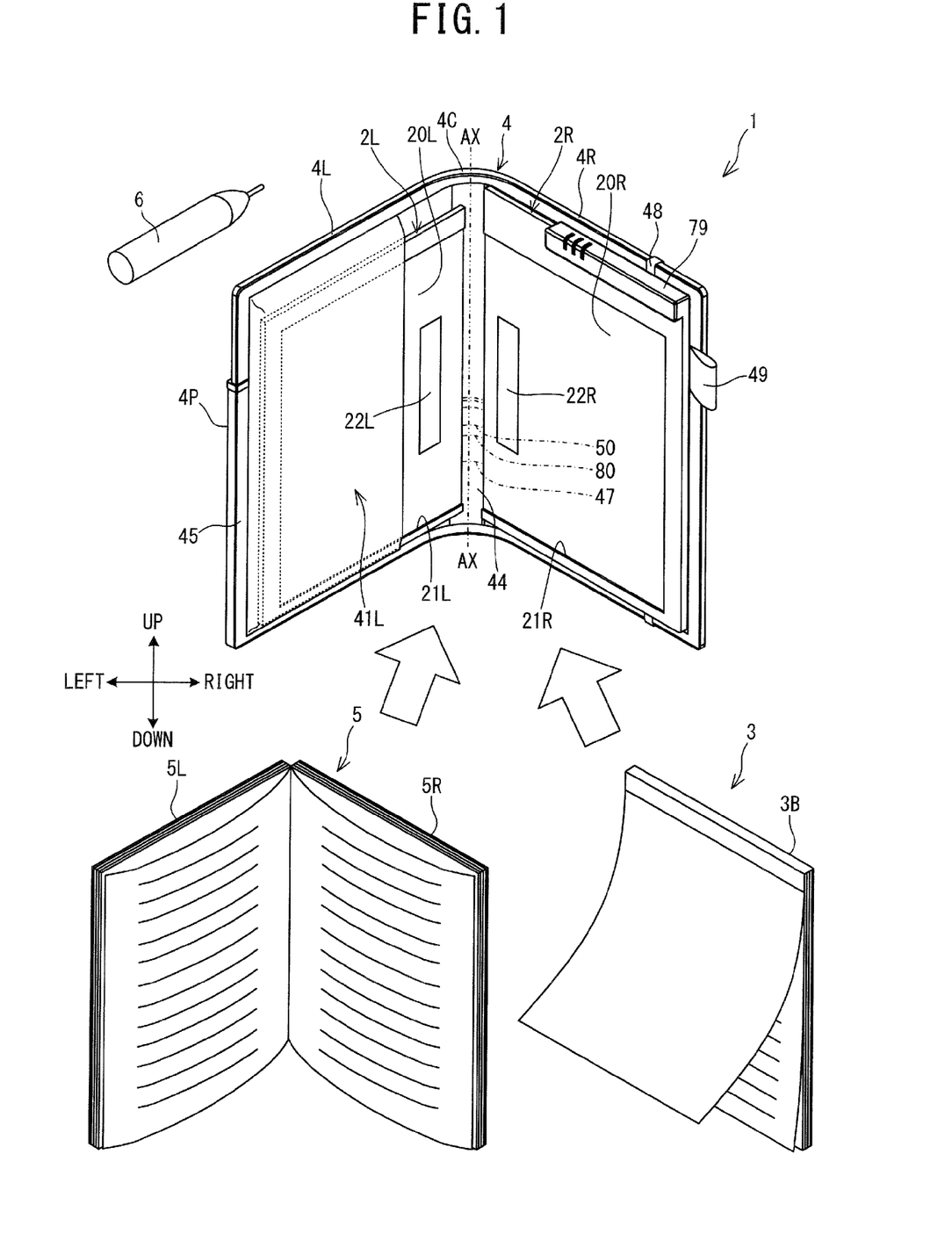
FIG. 1 is an overall configuration diagram of an information input device 1.
Figure 2:
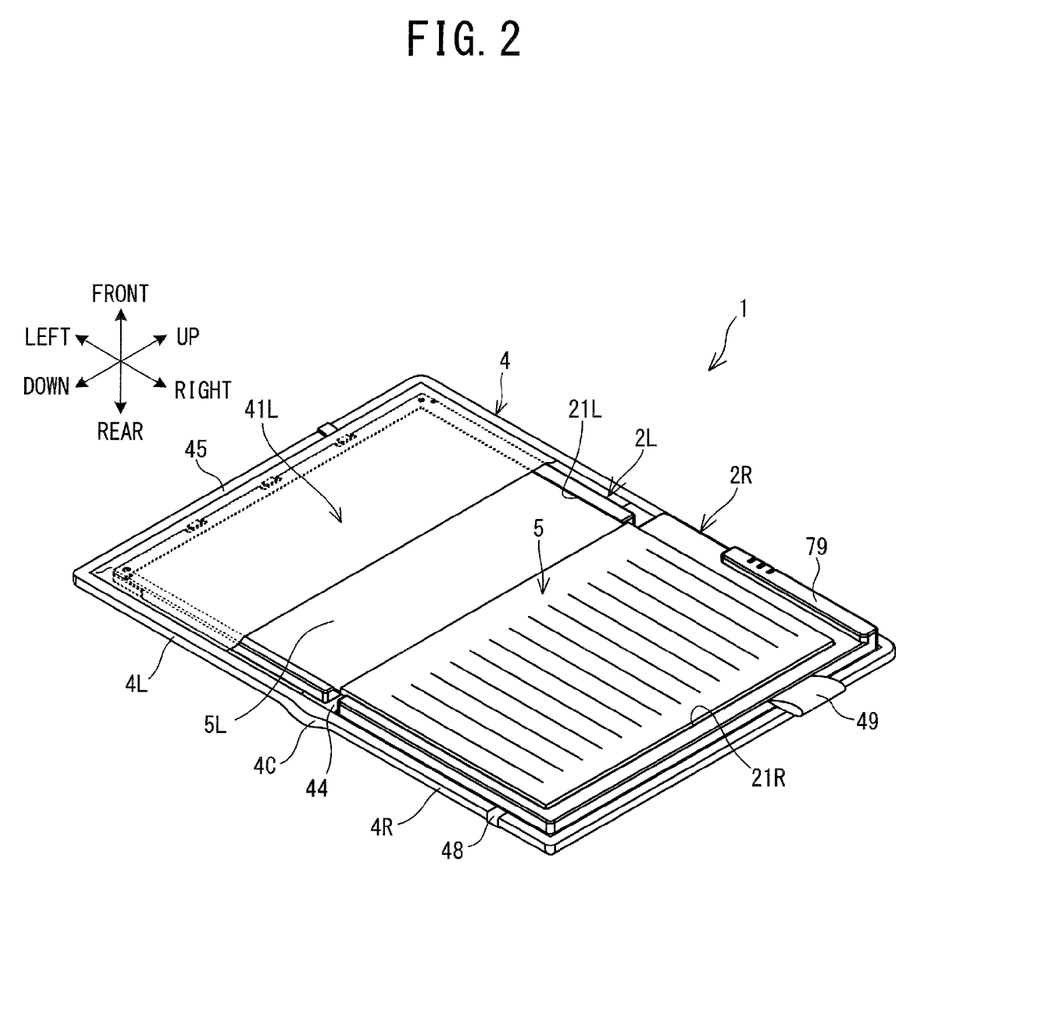
FIG. 2 is a perspective view of the information input device 1 in an open state when a notebook 5 is mounted thereon.
Figure 6:
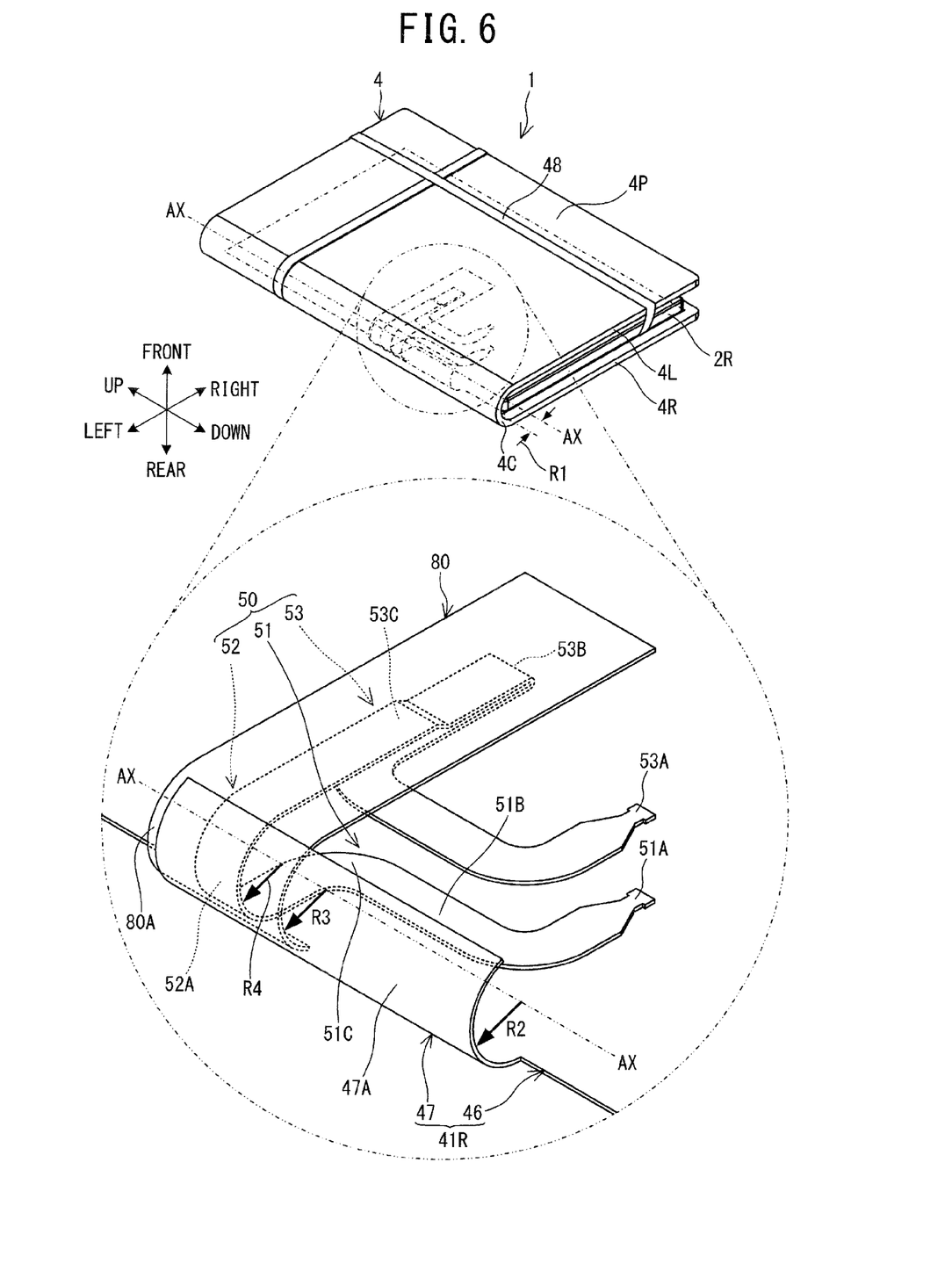
FIG. 6 is a perspective view showing positional relationships between the harness 50, the first protective sheet 47 and the second protective sheet 80 when the information input device 1 has been folded in a normal direction.
Figure 7:
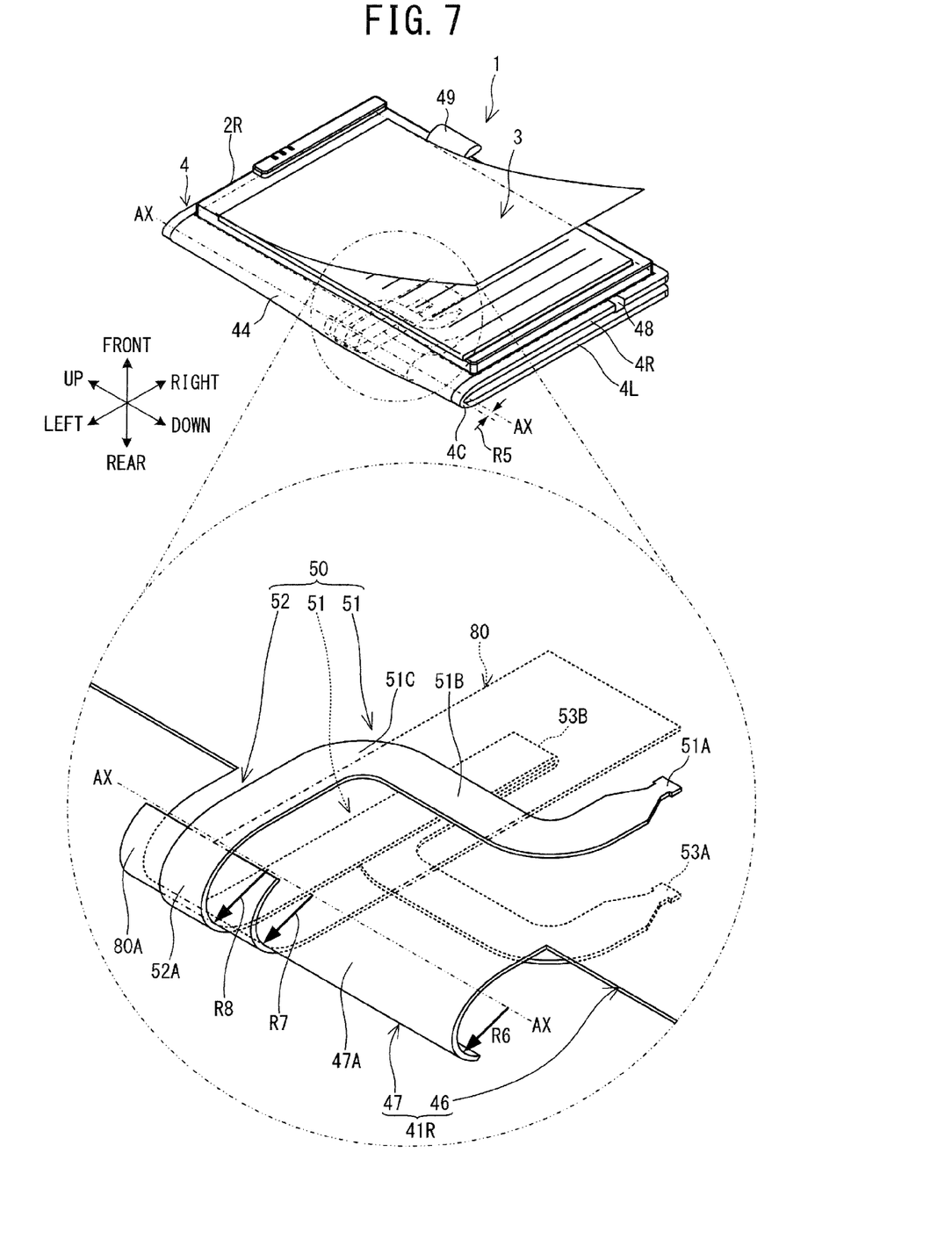
FIG. 7 is a perspective view showing positional relationships between the harness 50, the first protective sheet 47 and the second protective sheet 80 when the information input device 1 has been folded in a reverse direction.

In the explanation below, the upper side, the lower side, the upper left side, the lower right side, the lower left side and the upper right side of FIG. 2 are respectively defined as the front side, the rear side, the left side, the right side, the lower side and the upper side of the information input device 1. For explanatory convenience, the direction of an exterior cover 4 and a detection device 2L that are structural elements of the information input device 1 is defined according to the direction of the information input device 1, taking as a reference a state in which the information input device 1 is assembled. Similarly, for explanatory convenience, the direction of a notebook 5 that is mounted on the information input device 1 is defined according to the direction of the information input device 1, taking as a reference a state in which the notebook 5 is mounted on the information input device 1. FIG. 1 shows a state in which the information input device 1 is in the process of being opened or closed. FIG. 2 shows a state in which the information input device 1 is opened. However, in FIG. 6 and FIG. 7, the direction of the information input device 1 is defined taking, as a reference, the direction of a detection device 2R that has been assembled to the exterior cover 4. FIG. 6 shows a state in which the information input device 1 is closed. FIG. 7 shows a state in which the information input device 1 is folded in a reverse direction.

The information input device 1 according to the present embodiment will be explained with reference to FIG. 1 to FIG. 3. The information input device 1 shown in FIG. 1 is a tablet-type handwriting input device that a user can carry around. The information input device 1 is provided in a state in which the two plate-shaped detection devices 2L and 2R are assembled to the exterior cover 4. The exterior cover 4 is configured to be foldable such that, when the front side of the exterior cover 4 is in a two-page spread state, the exterior cover 4 can be folded into two in the left-right direction. The exterior cover 4 includes a left cover 4L and a right cover 4R. The detection device 2L is disposed on the left cover 4L and the detection device 2R is disposed on the right cover 4R. The user mounts a booklet-like recording medium, such as the notebook 5, on the detection devices 2L and 2R, and writes information on the notebook 5 using an electronic pen 6. The information input device 1 can read information written on the notebook 5, using the detection devices 2L and 2R. The electronic pen 6 is a writing tool which can be used to write information (characters, symbols, graphics, numbers and the like) on the notebook 5 using ink, and which can be used to input the written information into the detection devices 2L and 2R. The electronic pen 6 of the present embodiment is internally provided with a variable-capacitance capacitor, a coil and the like (which are not shown in the drawings). They form a known resonance (tuned) circuit. The detection devices 2L and 2R can detect a position of the electronic pen 6 when the electronic pen 6 comes close to them, using a known electromagnetic induction method.

As shown in FIG. 1 and FIG. 2, the detection devices 2L and 2R are configured such that the notebook 5 can be fixed to the front surfaces of the detection devices 2L and 2R. Specifically, the front surfaces of the detection devices 2L and 2R have concave positioning portions 21L and 21R, respectively. The positioning portions 21L and 21R perform positioning when a left front cover 5L and a right front cover 5R of the notebook 5 are fixed. The positioning portion 21L has a step on each of the upper side, the left side and the lower side, and has no step on the right side. The steps provided on the upper side, the left side and the lower side of the positioning portion 21L come into contact with edge portions on the upper side, the left side and the lower side of the left front cover 5L of the notebook 5, and thus determine the position of the notebook 5 with respect to the detection device 2L. The positioning portion 21L has a bonding portion 22L (refer to FIG. 1) that is slightly adhesive, at a position in the vicinity of the right side inside the concave portion. The bonding portion 22L bonds and fixes the left front cover 5L of the notebook 5 to the positioning portion 21L in a state in which the left front cover 5L can be easily peeled off. The positioning portion 21R has a step on each of the upper side, the right side and the lower side, and has no step on the left side. The steps provided on the upper side, the right side and the lower side of the positioning portion 21R come into contact with edge portions on the upper side, the right side and the lower side of the right front cover 5R of the notebook 5, and thus determine the position of the notebook 5 with respect to the detection device 2R. The positioning portion 21R has a bonding portion 22R (refer to FIG. 1) that is slightly adhesive, at a position in the vicinity of the left side inside the concave portion. The bonding portion 22R bonds and fixes the right front cover 5R of the notebook 5 to the positioning portion 21R in a state in which the right front cover 5R can be easily peeled off.

Figure 3:
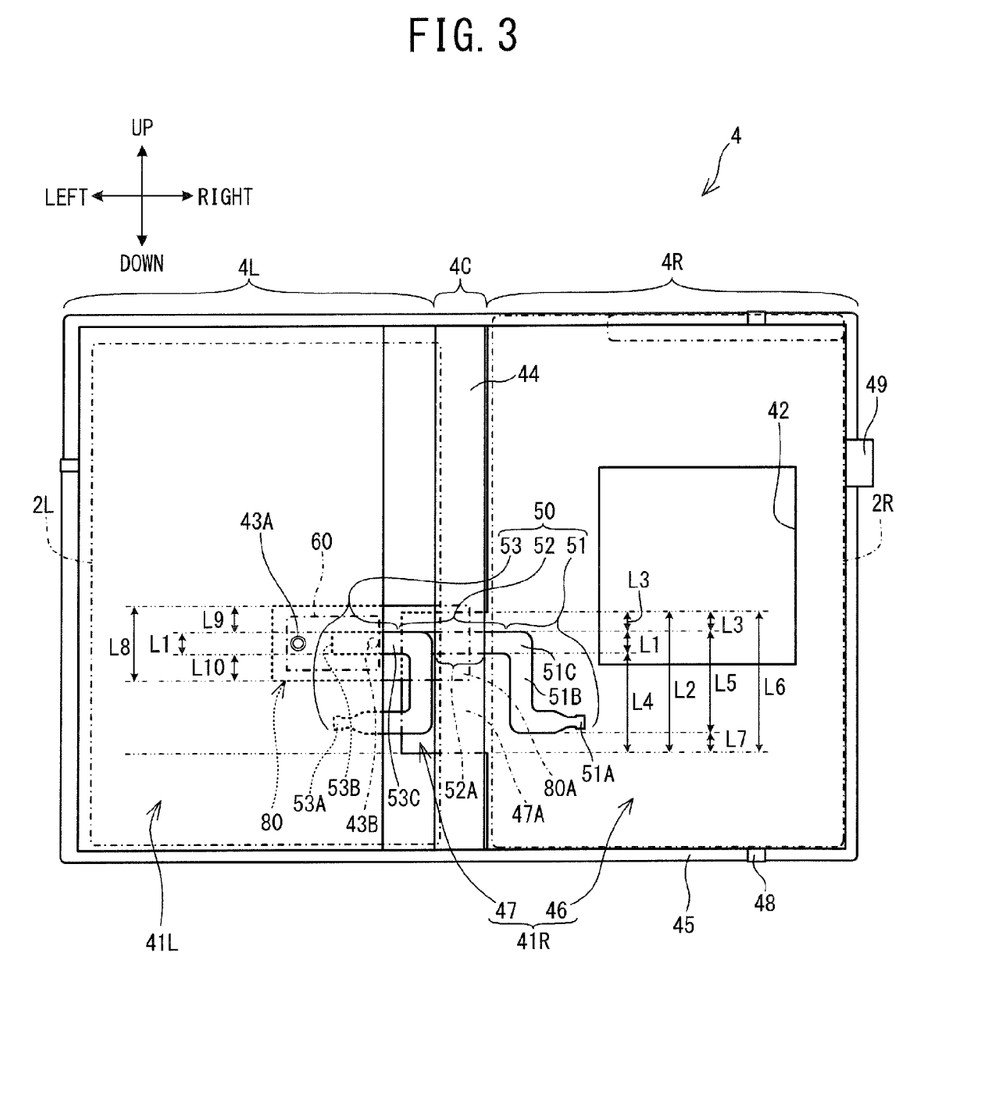
FIG. 3 is a front view of an exterior cover 4 in an open state and a harness 50.

As shown in FIG. 3, in a state in which the exterior cover 4 is not folded, the exterior cover 4 is a rectangular plate-shaped member that is long in the left-right direction. The exterior cover 4 includes the left cover 4L, the right cover 4R and a folding portion 4C. The left cover 4L holds the detection device 2L. The right cover 4R fixes the detection device 2R. The folding portion 4C couples the left cover 4L and the right cover 4R at the center in the left-right direction. The exterior cover 4 is made of a flexible material (such as artificial leather or nylon) that can be deformed in response to an external force. An insulating sheet (not shown in the drawings) is woven into each of the right cover 4R and the left cover 4L of the exterior cover 4. Each of the sheets is arranged over substantially the entire surface of the right cover 4R and the left cover 4L. The sheets make it difficult for static electricity generated on the rear surface side of the exterior cover 4 to pass through the weave of the right cover 4R and the left cover 4L in the thickness direction and to reach the detection devices 2L and 2R.

The folding portion 4C can be folded along an axis line AX (refer to FIG. 1) that extends in the up-down direction, such that the front surface of the folding portion 4C is on the inner side. More specifically, when the folding portion 4C is folded, the exterior cover 4 can be folded (refer to FIG. 6) in a direction (hereinafter also referred to as a "normal direction") in which detection surfaces 20L and 20R of the detection devices 2L and 2R (the front surfaces in the positioning portions 21L and 21R) face each other, from a state in which the exterior cover 4 has not been folded. Further, the folding portion 4C can also be folded along the axis line AX such that the rear surfaces in the positioning portions 21L and 21R are on the inner side. More specifically, when the folding portion 4C is folded, the exterior cover 4 can also be folded (refer to FIG. 7) in a direction (hereinafter also referred to as a "reverse direction") in which rear surfaces 26L and 26R (refer to FIG. 4) of the detection devices 2L and 2R face each other, from the state in which the exterior cover 4 has not been folded.

The right cover 4R of the exterior cover 4 is provided with a fixing sheet 41R to fix the detection device 2R. The fixing sheet 41R is a transparent soft polyvinyl chloride sheet, for example. The fixing sheet 41R includes a mounting sheet 46 and a first protective sheet 47. The mounting sheet 46 has a rectangular shape that is long in the up-down direction in a front view. The first protective sheet 47 has a rectangular shape and protrudes leftward from a portion of the left edge of the mounting sheet 46. Three sides (i.e., the upper side, the right side and the lower side) of the mounting sheet 46 are respectively woven into edge portions 45 of the exterior cover 4. Of the left side of the mounting sheet 46, a section where the first protective sheet 47 is not provided is woven into the folding portion 4C. With the above-described structure, the mounting sheet 46 is fixed to the exterior cover 4. The first protective sheet 47 extends to the folding portion 4C side. The first protective sheet 47 will be described in more detail later. For example, when a double-sided adhesive tape or the like is used to bond the rear surface 26R (refer to FIG. 4) to the mounting sheet 46, the detection device 2R is fixed to the exterior cover 4. The fixing sheet 41R has an opening 42 at its central portion. The rear surface 26R of the detection device 2R has a battery mounting portion (not shown in the drawings). The battery mounting portion is arranged inside the opening 42. The rear surface of the exterior cover 4 is provided with a pocket cover 4P (refer to FIG. 6) that can be opened and closed using a surface fastener. By the user opening the pocket cover 4P, the user can replace a battery (not shown in the drawings) without removing the detection device 2R from the exterior cover 4.

The left cover 4L of the exterior cover 4 has a holding sheet 41L that holds the detection device 2L. The holding sheet 41L is a transparent soft polyvinyl chloride sheet, for example. Three sides (i.e., the upper side, the left side and the lower side) of the holding sheet 41L are respectively woven into the edge portions 45 of the exterior cover 4, and the right side of the holding sheet 41L is open. The detection device 2L is inserted between the holding sheet 41L and the front surface of the left cover 4L from the right side of the holding sheet 41L. The right side of the holding sheet 41L is positioned to the left of the right edge of the left cover 4L. The detection device 2L is held by the holding sheet 41L in a state in which a right end portion of the detection device 2L protrudes to the right from the right side of the holding sheet 41L. As will be described in detail later, the detection device 2L is provided with a holder 60 on the rear surface 26L side (refer to FIG. 4). The holder 60 is configured such that it can slide in the left-right direction with respect to a main body portion of the detection device 2L. The left cover 4L of the exterior cover 4 is provided with two eyelets 43A and 43B that fix the holder 60. The eyelets 43A and 43B are arranged side by side in the left-right direction. Protruding portions 67 and 68 (refer to FIG. 5) respectively engage with the eyelets 43A and 43B, and the holder 60 is thus fixed to the left cover 4L. When the holder 60 is fixed to the left cover 4L, the detection device 2L is held by the holding sheet 41L in a state in which the detection device 2L can slide in the left-right direction with respect to the left cover 4L of the exterior cover 4. A second protective sheet 80, which has a rectangular shape that is long in the left-right direction, is fixed to the holder 60. The second protective sheet 80 is a transparent soft polyvinyl chloride sheet, for example. The second protective sheet 80 extends to the folding portion 4C side. The second protective sheet 80 will be described in more detail later.

The exterior cover 4 is provided with a wide band-shaped body 44 on the front surface side of the folding portion 4C. The band-shaped body 44 extends in the up-down direction and covers the folding portion 4C. In a state in which the band-shaped body 44 is stretched in the up-down direction, the upper end and the lower end of the band-shaped body 44 are respectively woven into the upper and lower edge portions 45 of the exterior cover 4. A gap is provided between the band-shaped body 44 and the front surface of the folding portion 4C. As will be described in detail later, a harness 50 that connects the detection devices 2L and 2R, the first protective sheet 47 of the fixing sheet 41R and the second protective sheet 80 are caused to pass through the gap between the band-shaped body 44 and the front surface of the folding portion 4C, in a state in which they are overlaid in the front-rear direction. When the exterior cover 4 is in an open state, the band-shaped body 44 covers and hides the harness 50, the first protective sheet 47 and the second protective sheet 80. When the exterior cover 4 is folded in the normal direction, the band-shaped body 44 is positioned on the inner side of the curve and retains the harness 50, the first protective sheet 47 and the second protective sheet 80 from the front. The band-shaped body 44 guides the bending direction so that the harness 50, the first protective sheet 47 and the second protective sheet 80 curve around the axis line AX (refer to FIG. 1) along the front surface of the folding portion 4C. When the exterior cover 4 is folded in the reverse direction, the band-shaped body 44 is positioned on the outer side of the curve, and covers and hides the harness 50, the first protective sheet 47 and the second protective sheet 80. Further, the exterior cover 4 is provided with a band 48 that can retain the pocket cover 4P in a closed state (and that can also be used as a bookmark), a holder 49 of the electronic pen 6, and the like. Written materials etc. can be stored between the pocket cover 4P and the exterior cover 4.

Next, the structure of the detection devices 2L and 2R will be explained with reference to FIG. 3 to FIG. 5. As described above, the detection devices 2L and 2R are devices that can detect a position of the electronic pen 6 when the electronic pen 6 comes close to them, using a known electromagnetic induction method. Each of the detection devices 2L and 2R has a rectangular shape that is long in the up-down direction in a front view, and is a box-shaped body that is thin in the front-rear direction.

Figure 4:
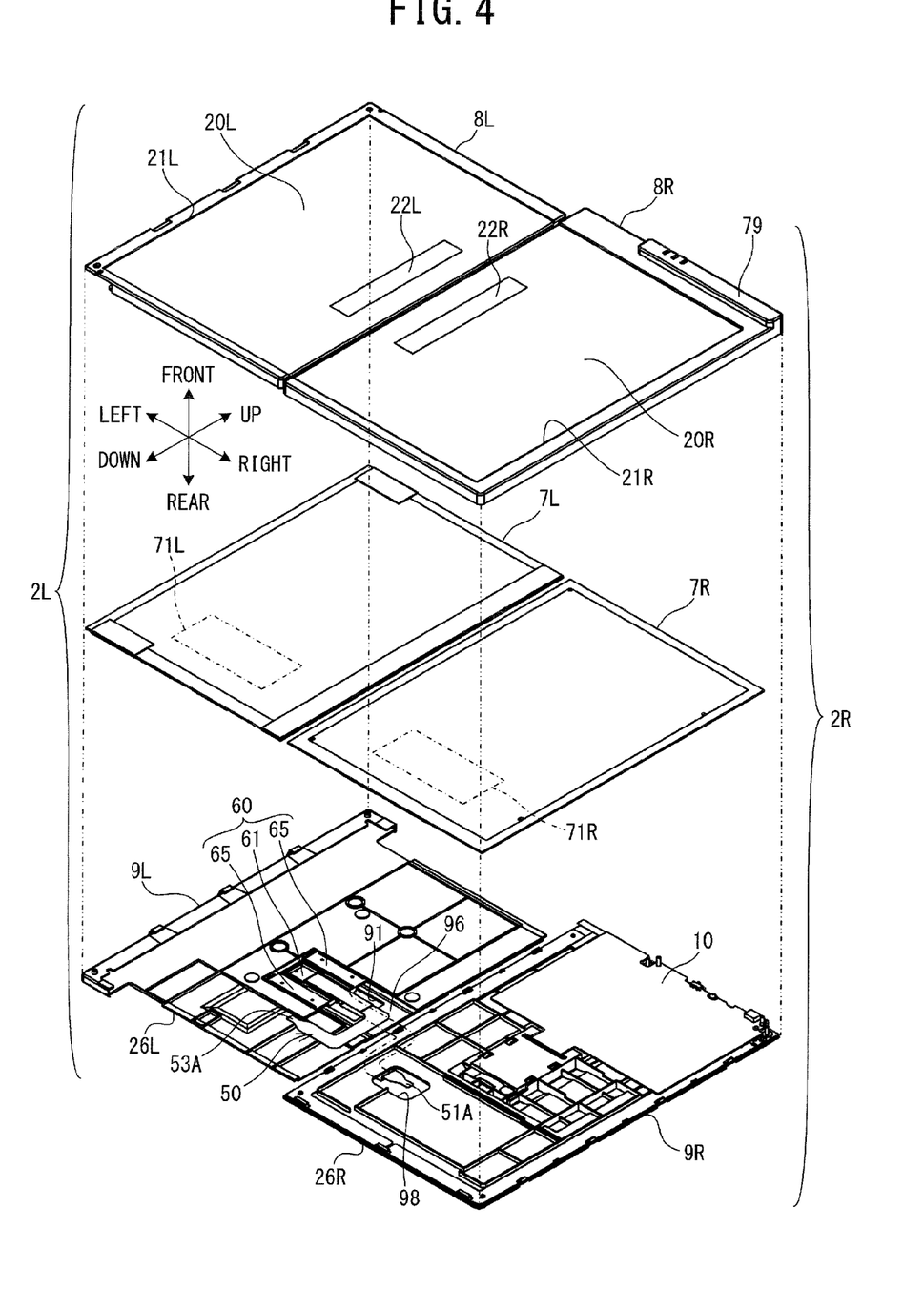
FIG. 4 is an exploded perspective view of detection devices 2L and 2R.

As shown in FIG. 4, the detection device 2R is provided with a front housing 8R and a rear housing 9R. The front housing 8R and the rear housing 9R are resin plates that have a substantially rectangular shape and that are long in the up-down direction. The above-described positioning portion 21R is provided on the front surface of the front housing 8R. Detection of a position of the approaching electronic pen 6 by a digitizer board 7R, which will be described later, is performed on the front surface side of the front housing 8R. The front surface of the front housing 8R in the positioning portion 21R is the detection surface 20R of the detection device 2R of the present embodiment. When the front housing 8R and the rear housing 9R are combined, a box-shaped body having an internal storage space is formed. An opening portion 98 that penetrates in the front-rear direction is formed in the rear housing 9R, below the center of the rear housing 9R in the up-down direction and to the left of the center in the left-right direction. The harness 50 that connects to the digitizer board 7R is caused to pass through the opening portion 98. As will be described in detail later, a portion of the harness 50 is wired along the rear surface 26R of the detection device 2R.

The detection device 2R houses the digitizer board 7R, a control board 71R and a main board 10, between the front housing 8R and the rear housing 9R. The digitizer board 7R is configured to detect a position of the approaching electronic pen 6. The control board 71R is configured to control a current that is caused to flow through the digitizer board 7R. A CPU (not shown in the drawings) that performs overall control of the information input device 1 is installed on the main board 10. The main board 10 is provided with a power source switch, light emitting elements, a communication portion etc., various switches and components such as connectors (not shown in the drawings). These components are housed in a housing portion 79 that is provided in an upper right end portion of the front housing 8R. The CPU of the main board 10 can perform wireless or wired communication with an external device (not shown in the drawings), such as a PC, that is positioned in the vicinity of the information input device 1. The main board 10 is electrically connected to the control board 71R. The control board 71R is provided integrally with the digitizer board 7R, on a lower end portion of the rear surface of the digitizer board 7R.

The digitizer board 7R is a board on which many long and thin loop coils are arrayed in each of the X axis direction (specifically, the left-right direction) and the Y axis direction (specifically, the up-down direction). The control board 71R generates a magnetic field by causing a current of a specific frequency (a sending current for excitation) to flow through each one of the loop coils. As a result, a resonance circuit of the electronic pen 6 that comes close to the digitizer board 7R generates an induced magnetic field. A current (a signal current) flows through the loop coils due to the induced magnetic field. The control board 71R detects the signal current that flows through the loop coils. Based on the signal current detected by the control board 71R, the CPU of the main board 10 obtains position coordinates of the electronic pen 6 over time. The CPU generates stroke data that indicates a trajectory of the electronic pen 6 based on the position coordinates. The CPU outputs the stroke data to an external device (such as a PC) that is connected to the information input device 1.

Similarly to the detection device 2R, the detection device 2L is provided with a front housing 8L and a rear housing 9L. The front housing 8L and the rear housing 9L are resin plates that have a substantially rectangular shape and that are long in the up-down direction. The above-described positioning portion 21L is provided on the front surface of the front housing 8L. Detection of a position of the approaching electronic pen 6 by a digitizer board 7L, which will be described later, is performed on the front surface side of the front housing 8L. The front surface of the front housing 8L in the positioning portion 21L is the detection surface 20L of the detection device 2L of the present embodiment. When the front housing 8L and the rear housing 9L are combined, a box-shaped body having an internal storage space is formed.

The detection device 2L houses the digitizer board 7L and a control board 71L, between the front housing 8L and the rear housing 9L. The digitizer board 7L is configured to detect a position of the approaching electronic pen 6. The control board 71L is configured to control a current that is caused to flow through the digitizer board 7L. The control board 71L is provided integrally with the digitizer board 7L, on a lower end portion of the rear surface of the digitizer board 7L. The digitizer board 7L and the control board 71L are configured in the same manner as the digitizer board 7R and the control board 71R of the detection device 2R, and can detect a position of the approaching electronic pen 6 using a known electromagnetic induction method.

As shown in FIG. 3 and FIG. 4, the control board 71R and the control board 71L are connected by the harness 50. The harness 50 is a flexible board on which is formed a pattern that electrically connects the control board 71R and the control board 71L. More specifically, the harness 50 is a flexible insulating film on which a plurality of conductive paths are formed. A terminal portion 51A on one end of the harness 50 is connected to the control board 71R, and a terminal portion 53A on the other end of the harness 50 is connected to the control board 71L. As shown in FIG. 5, a section of the harness 50 between the terminal portion 51A and the terminal portion 53A is wired in a state in which the section is folded over into two layers in the front-rear direction. The folded section of the harness 50 is provided with the holder 60 that protects the harness 50. The harness 50 and the holder 60 will be described in more detail later.

As described above, the left cover 4L (refer to FIG. 1) holds the detection device 2L such that the detection device 2L can slide in the left-right direction. The right cover 4R (refer to FIG. 1) fixes the detection device 2R. More specifically, in a state in which the exterior cover 4 is opened, the left cover 4L holds the detection device 2L such that the detection device 2L can move in a direction in which it approaches and separates from the detection device 2R. The harness 50, which connects the control board 71R and the control board 71L, and the holder 60 are configured in the following manner so that the detection device 2L is configured to be movable with respect to the detection device 2R. As shown in FIG. 4 and FIG. 5, an opening portion 91 that penetrates in the front-rear direction is formed in the rear housing 9L, below the center of the rear housing 9L in the up-down direction and to the right of the center in the left-right direction. The opening portion 91 has a substantially rectangular shape that is long in the left-right direction. The front surface of the rear housing 9L has a concave portion 96 that is formed around the opening portion 91. The concave portion 96 is engaged with collar portions 65 of the holder 60. The concave portion 96 supports the holder 60 such that the holder 60 can slide in the left-right direction.

The holder 60 includes a main body portion 61 and the two collar portions 65. The main body portion 61 has a rectangular shape that is long in the left-right direction in a front view, and has a box shape that is short in the front-rear direction. Walls are not formed on the front side and the right side of the main body portion 61. The main body portion 61 is disposed inside the opening portion 91 of the rear housing 9L. The holder 60 is restricted from moving in the up-down direction by the upper edge and the lower edge of the opening portion 91. The holder 60 can move in the left-right direction by a difference in length between the main body portion 61 and the opening portion 91.

The two collar portions 65 respectively protrude upward and downward from a front end portion of an upper side wall and a front end portion of a lower side wall. The collar portions 65 engage with the concave portion 96 of the rear housing 9L. When the main body portion 61 of the holder 60 is disposed inside the opening portion 91, the rear surfaces of the collar portions 65 come into contact with the front surface of the concave portion 96, and the front surfaces of the collar portions 65 come into contact with the rear surface of the digitizer board 7L. The holder 60 can slide in the left-right direction within a range from a position where the left end of the main body portion 61 comes into contact with a left edge portion of the opening portion 91 to a position where the right end of the main body portion 61 comes into contact with a right edge portion of the opening portion 91.

A rear side wall of the main body portion 61 is provided with the two protruding portions 67 and 68 that protrude rearward in a cylindrical shape. The protruding portion 67 is provided on a left end portion of the rear side wall of the main body portion 61. The protruding portion 67 engages with the eyelet 43A (refer to FIG. 3) that is provided on the exterior cover 4. The protruding portion 68 is provided on a right end portion of the rear side wall of the main body portion 61. The protruding portion 68 engages with the eyelet 43B. By engaging the protruding portions 67 and 68 with the eyelets 43A and 43B of the exterior cover 4, the holder 60 supports the detection device 2L on the exterior cover 4 by means of the collar portions 65.

Figure 5:
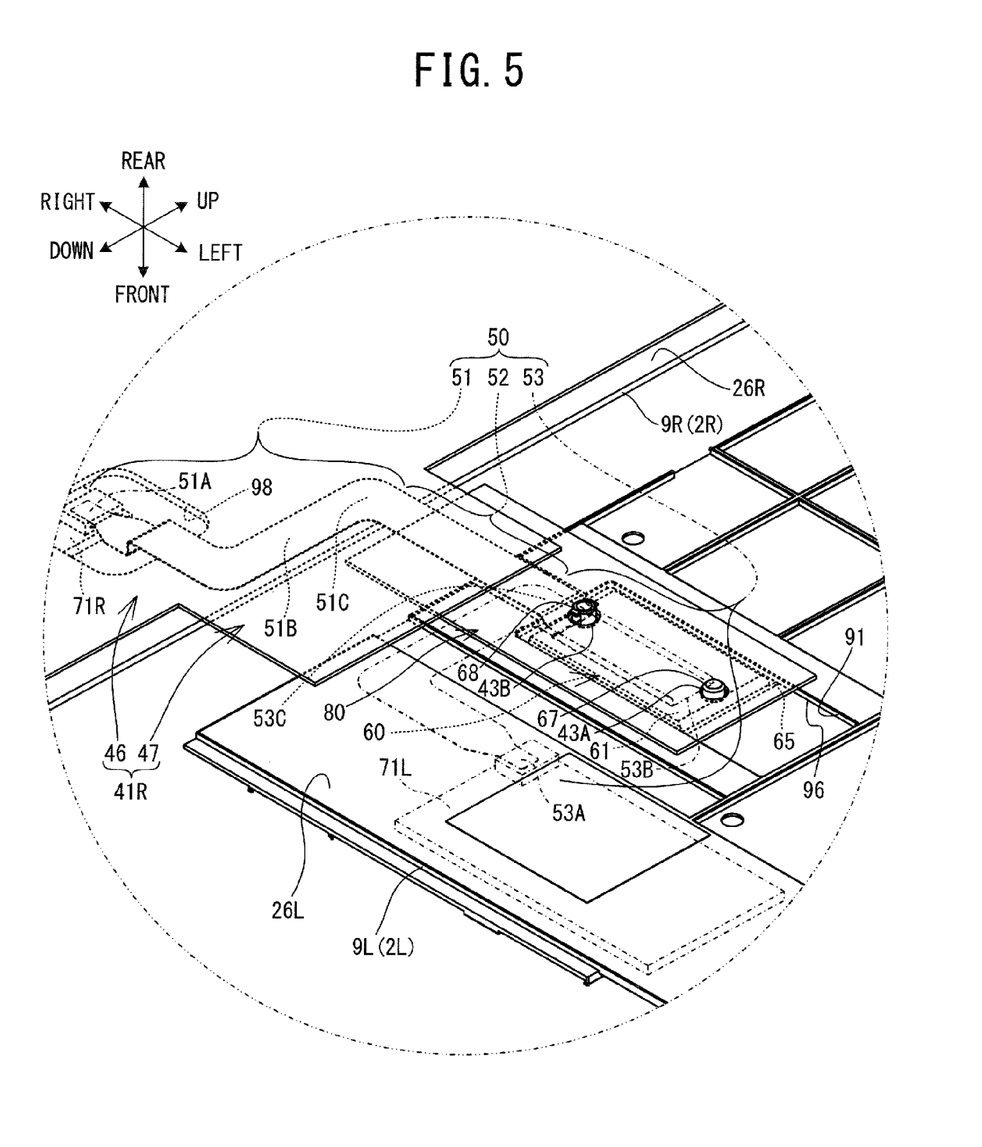
FIG. 5 is a perspective view showing positional relationships between a holder 60 and the harness 50 that have been assembled to a rear housing 9L, a second protective sheet 80 and a first protective sheet 47.

As shown in FIG. 3 and FIG. 5, the harness 50 includes a right-side connecting portion 51, an intermediate portion 52 and a left-side connecting portion 53. The right-side connecting portion 51 includes the terminal portion 51A that is provided on one end of the harness 50, and at least a part of the right-side connecting portion 51 is disposed between the rear surface 26R of the detection device 2R and the right cover 4R. The terminal portion 51A is inserted, from the left side, into a connector portion (not shown in the drawings) of the control board 71R and is thus connected to the connector portion. The right-side connecting portion 51 bends in a stepped manner to the rear from a position on the left side of the terminal portion 51A, passes through the opening portion 98 of the rear housing 9R, and is exposed to the rear surface 26R. The right-side connecting portion 51 bends upward from a position that is to the left of the opening portion 98, and extends upward along the rear surface 26R of the detection device 2R. An end portion 51C that is on an opposite side to the terminal portion 51A is disposed in a position that is closer to the center than an end portion in the up-down direction of the detection device 2R. Note that the portion that extends in the up-down direction along the rear surface 26R between the terminal portion 51A and the terminal portion 51C is referred to as an extending portion 51B.

The intermediate portion 52 is a portion that extends in the left-right direction between the detection device 2R and the detection device 2L. The intermediate portion 52 extends leftward from the end portion 51C of the right-side connecting portion 51, and connects to an end portion 53C of the left-side connecting portion 53. The intermediate portion 52 forms a connection between the detection device 2R and the detection device 2L, in a position that is closer to the center than the end portions in the up-down direction of the detection devices 2L and 2R, and extends toward the holder 60.

The left-side connecting portion 53 includes the terminal portion 53A that is provided on the other end of the harness 50, and at least a part of the left-side connecting portion 53 is disposed between the rear surface 26L of the detection device 2L and the left cover 4L. The terminal portion 53A is inserted, from the right side, into a connector portion (not shown in the drawings) of the control board 71L and is thus connected to the connector portion. Inside the detection device 2L, the left-side connecting portion 53 bends upward from a position that is to the right of the terminal portion 53A, and extends upward toward a position that is closer to the center than the end portion in the up-down direction of the detection device 2L. The left-side connecting portion 53 bends to the left from a position that is close to the center in the up-down direction of the detection device 2L, and extends into the opening portion 91. The left-side connecting portion 53 bends to the rear and is folded back at 180 degrees with respect to an axis that extends in the up-down direction inside the main body portion 61 of the holder 60 disposed in the opening portion 91, and extends to the right. Of the left-side connecting portion 53, the portion that is folded back at 180 degrees with respect to the axis extending in the up-down direction is referred to as a bending portion 53B. In a state in which the bending portion 53B is maintained in an arc shape, the left-side connecting portion 53 is folded over in two layers in the front-rear direction and is disposed inside the holder 60. The bending portion 53B is a portion that deforms, similarly to an endless track (crawler track) belt, in accordance with movement of the holder 60 in the left-right direction. Inside the holder 60, the layer on the rear side of the left-side connecting portion 53 extends to the right from the bending portion 53B, and bends in a stepped manner to the rear from a position where the left-side connecting portion 53 is exposed to the right from the holder 60. The end portion 53C that is on an opposite side to the terminal portion 53A is disposed between the rear surface 26L of the detection device 2L and the left cover 4L. The end portion 53C of the left-side connecting portion 53 is connected to the intermediate portion 52.

As shown in FIG. 3, the intermediate portion 52 of the harness 50 is wired such that it is caused to pass between the band-shaped body 44 and the front surface of the folding portion 4C of the exterior cover 4. When the exterior cover 4 is folded in the normal direction or the reverse direction, a portion of the intermediate portion 52 of the harness 50 that bends in accordance with the bending of the folding portion 4C is referred to as a bending portion 52A. As described above, the first protective sheet 47 that is a section of the fixing sheet 41R extends to the left from the left edge of the mounting sheet 46, more specifically, a position on the lower end side with respect to the center in the up-down direction of the left edge, and is caused to pass between the band-shaped body 44 and the front surface of the folding portion 4C. The first protective sheet 47 has a first arrangement portion 47A that is disposed between the front surface of the folding portion 4C and the bending portion 52A. More specifically, the first arrangement portion 47A is disposed on the rear side of the harness 50.

The intermediate portion 52 is disposed on the front side of the first arrangement portion 47A and inside the first arrangement portion 47A in the up-down direction. The first arrangement portion 47A of the first protective sheet 47 is configured such that a length L2 in the up-down direction of the first arrangement portion 47A is longer than a length L1 in the up-down direction of the intermediate portion 52 of the harness 50. The length L2 in the up-down direction of the first arrangement portion 47A is at least 20 mm longer than the length L1 in the up-down direction of the intermediate portion 52. In more detail, lengths L3 and L4 between both the end portions in the up-down direction of the first arrangement portion 47A and both the end portions in the up-down direction of the intermediate portion 52 are each set to be a length of 10 mm or more. When static electricity is generated on the rear surface side of the exterior cover 4, the static electricity passes through the weave of the folding portion 4C in the thickness direction, moves along the front surface of the first arrangement portion 47A, and reaches the intermediate portion 52. With the above-described structure, the first arrangement portion 47A can secure a creepage distance of at least 10 mm, through which the static electricity moves to the intermediate portion 52. Further, when static electricity is generated on the rear side of the intermediate portion 52, the first arrangement portion 47A can secure a creepage distance of 10 mm or more up to the end portion along the rear surface of the first arrangement portion 47A, and further secure a creepage distance of 10 mm or more until the static electricity reaches the intermediate portion 52 from the end portion along the front surface of the first arrangement portion 47A.

Further, the extending portion 51B of the right-side connecting portion 51 of the harness 50 is disposed on the front side of the first arrangement portion 47A and inside the first arrangement portion 47A in the up-down direction, and is exposed to the rear surface 26R of the detection device 2R. When a twist in a direction different from the left-right direction is generated in the harness 50 when the exterior cover 4 is opened or closed, it is possible that the extending portion 51B of the harness 50 may protrude to the folding portion 4C side, where the insulating sheet is not provided. The first arrangement portion 47A is configured such that the length L2 in the up-down direction is longer than a length L5 by which the extending portion 51B extends in the up-down direction. The length L2 in the up-down direction of the first arrangement portion 47A is at least 20 mm longer than the length L5 in the up-down direction of the extending portion 51B. More specifically, the length L3 and a length L7 are each set to be a length of 10 mm or more. The length L3 is a length between an upper end portion of the first arrangement portion 47A and an upper end portion of the extending portion 51B. The length L7 is a length between a lower end portion of the first arrangement portion 47A and a lower end portion of the extending portion 51B. Therefore, until the static electricity that has passed through the weave of the folding portion 4C in the thickness direction reaches the extending portion 51B, it is possible to secure a creepage distance of at least 10 mm through which the static electricity moves along the front surface of the first arrangement portion 47A. Further, even when the extending portion 51B protrudes to the folding portion 4C side, it is possible to maintain a state in which the first arrangement portion 47A is disposed between the extending portion 51B and the folding portion 4C.

As described above, the second protective sheet 80 is fixed to the holder 60. The second protective sheet 80 extends to the right from the position of the holder 60, and is caused to pass between the band-shaped body 44 and the front surface of the folding portion 4C. The second protective sheet 80 has a second arrangement portion 80A that is disposed between the front surface of the folding portion 4C and the bending portion 52A. More specifically, the second arrangement portion 80A is disposed to the rear of the harness 50. Further, the second protective sheet 80 is disposed on the front side of the first protective sheet 47. More specifically, the first arrangement portion 47A and the second arrangement portion 80A are disposed to be overlapped with each other in the front-rear direction, between the front surface of the folding portion 4C and the bending portion 52A.

The intermediate portion 52 is disposed on the front side of the second arrangement portion 80A and inside the second arrangement portion 80A in the up-down direction. The second arrangement portion 80A is configured such that a length L8 in the up-down direction of the second arrangement portion 80A is longer than the length L1 in the up-down direction of the intermediate portion 52. The length L8 in the up-down direction of the second arrangement portion 80A is at least 20 mm longer than the length L1 in the up-down direction of the intermediate portion 52. In more detail, lengths L9 and L10 are each set to be a length of 10 mm or more. The length L9 is a length between an upper end portion of the second arrangement portion 80A and an upper end portion of the intermediate portion 52. The length L10 is a length between a lower end portion of the second arrangement portion 80A and a lower end portion of the intermediate portion 52. When static electricity is generated on the rear surface side of the exterior cover 4, the static electricity passes through the weave of the folding portion 4C in the thickness direction, moves along the front surface of the second arrangement portion 80A, and reaches the intermediate portion 52. With the above-described structure, the second arrangement portion 80A can secure a creepage distance of at least 10 mm, through which the static electricity moves to the intermediate portion 52. Further, when static electricity is generated on the rear side of the intermediate portion 52, the second arrangement portion 80A can secure a creepage distance of 10 mm or more up to the end portion along the rear surface of the second arrangement portion 80A, and further secure a creepage distance of 10 mm or more until the static electricity reaches the intermediate portion 52 from the end portion along the front surface of the second arrangement portion 80A.

Next, the state of the harness 50 when the exterior cover 4 is folded will be explained with reference to FIG. 6 and FIG. 7. As shown in FIG. 6, when the information input device 1 is folded in the normal direction, the exterior cover 4 is folded in a state in which the detection device 2L and the detection device 2R are sandwiched between the left cover 4L and the right cover 4R. Due to the thickness of the detection devices 2L and 2R, the distance between the left cover 4L and the right cover 4R is increased in the front-rear direction. As a result, the folding portion 4C forms a gentle arc around the axis line AX and is folded and bent at 180 degrees. The first arrangement portion 47A of the first protective sheet 47 and the second arrangement portion 80A of the second protective sheet 80 are positioned on the inner surface side of the folding portion 4C. The second arrangement portion 80A is positioned on the inner surface side with respect to the first arrangement portion 47A. Along the inner surface of the folding portion 4C (namely, the front surface when the exterior cover 4 is opened), the first arrangement portion 47A is folded and bent at 180 degrees with a radius of curvature R2 that is smaller than a radius of curvature R1 of the curve of the folding portion 4C. Along the inner surface of the first arrangement portion 47A, the second arrangement portion 80A is folded and bent at 180 degrees with a radius of curvature R3 that is smaller than the radius of curvature R2 of the curve of the first arrangement portion 47A. Therefore, the overlapped state of the first arrangement portion 47A and the second arrangement portion 80A is maintained. The area of an overlapped part of the first arrangement portion 47A and the second arrangement portion 80A is larger than that before the exterior cover 4 is folded.

The bending portion 52A of the intermediate portion 52 of the harness 50 is disposed on the inner surface side of the folding portion 4C. The first arrangement portion 47A and the second arrangement portion 80A are arranged between the bending portion 52A and the folding portion 4C. Therefore, along the inner surface of the second arrangement portion 80A, the bending portion 52A is folded and bent at 180 degrees around the axis line AX, with a radius of curvature R4 that is smaller than the radius of curvature R3 of the curve of the second arrangement portion 80A. The first arrangement portion 47A and the second arrangement portion 80A are arranged along the front surface of the folding portion 4C that bends with the relatively gentle radius of curvature R1. Therefore, although the radius of curvature R4 of the bending portion 52A is smaller than the radius of curvature R1 of the folding portion 4C, the bending portion 52A shows a relatively gentle bending. Therefore, when the exterior cover 4 is folded in the normal direction, a bending load is unlikely to be applied to the bending portion 52A, and it is possible to inhibit breakage, disconnection and the like of the harness 50.

As shown in FIG. 1, there is a case in which, for example, a report pad 3 is mounted on the information input device 1. The report pad 3 is a recording medium in which a plurality of rectangular paper sheets are stacked together and one of the short sides is bound. The report pad 3 is mounted on the detection device 2R such that a back cover 3B is bonded and fixed, for example, to the positioning portion 21R of the detection device 2R using the bonding portion 22R.

The information input device 1 on which the report pad 3 has been mounted may be used by being folded in the reverse direction. As shown in FIG. 7, the exterior cover 4 is folded such that the rear surface of the left cover 4L and the rear surface of the right cover 4R face each other in a state in which the detection device 2L and the detection device 2R are respectively arranged on the outer sides. When the information input device 1 is folded in the reverse direction, the distance between the left cover 4L and the right cover 4R is short in the front-rear direction. Therefore, the folding portion 4C is folded back and bent at 180 degrees around the axis line AX, with a radius of curvature R5 that is smaller than the radius of curvature R1 (refer to FIG. 6) when the exterior cover 4 is folded in the normal direction. The first arrangement portion 47A and the second arrangement portion 80A are positioned on the outer surface side of the folding portion 4C. The second arrangement portion 80A is positioned on the outer surface side of the first arrangement portion 47A. Along the outer surface of the folding portion 4C (namely, the rear surface when the exterior cover 4 is opened), the first arrangement portion 47A is curved with a radius of curvature R6 that is larger than the radius of curvature R5 of the curve of the folding portion 4C. Along the outer surface of the first arrangement portion 47A, the second arrangement portion 80A is curved with a radius of curvature R7 that is larger than the radius of curvature R6 of the curve of the first arrangement portion 47A. Although the area of the overlapped part of the first arrangement portion 47A and the second arrangement portion 80A becomes smaller than that before the exterior cover 4 is folded, the overlapped state of the first arrangement portion 47A and the second arrangement portion 80A is maintained.

The bending portion 52A is disposed on the outer surface side of the folding portion 4C. The first arrangement portion 47A and the second arrangement portion 80A are disposed between the bending portion 52A and the folding portion 4C. Therefore, along the outer surface of the second arrangement portion 80A, the bending portion 52A is folded back and bent at 180 degrees around the axis line AX. More specifically, the bending portion 52A is curved in a state in which it is supported by the first arrangement portion 47A and the second arrangement portion 80A from the inner side. As described above, the first arrangement portion 47A is curved with the radius of curvature R6 that is larger than the radius of curvature R5 of the folding portion 4C. The second arrangement portion 80A is curved with the radius of curvature R7 that is larger than the radius of curvature R6 of the first arrangement portion 47A. Therefore, a radius of curvature R8 of the bending portion 52A is larger than the radius of curvature R5 of the folding portion 4C, the radius of curvature R6 of the first arrangement portion 47A and the radius of curvature R7 of the second arrangement portion 80A. In comparison to a case in which the first arrangement portion 47A and the second arrangement portion 80A are not provided, the bending portion 52A can secure the larger radius of curvature R8. Therefore, even when the exterior cover 4 is folded in the reverse direction, a bending load is unlikely to be applied to the bending portion 52A, and it is possible to inhibit breakage, disconnection and the like of the harness 50. Further, when the exterior cover 4 is folded in the reverse direction, the band-shaped body 44 is disposed on the outer surface side of the harness 50. Therefore, the harness 50 is covered and hidden by the band-shaped body 44 and is not exposed to the outside. Thus, the harness 50 is protected from breakage and the like due to contact with a foreign material.

Further, when the information input device 1 is used while being folded in the reverse direction, there is a case in which, for example, a pressing force is applied to the vicinity of the bending portion 52A in the front-rear direction from the outside. In this case, the first arrangement portion 47A and the second arrangement portion 80A that support the bending portion 52A from the inner surface side bend in the front-rear direction. However, the thickness direction of the first arrangement portion 47A and the second arrangement portion 80A intersects the front-rear direction at a substantially central portion of the fold. As a result of this, at the substantially central portion of the fold, the first arrangement portion 47A and the second arrangement portion 80A are unlikely to bend even when a pressing force from the outside is applied in the front-rear direction. In other words, at the substantially central portion of the fold, it is easy for the first arrangement portion 47A and the second arrangement portion 80A to maintain the radius of curvature R8 of the bending portion 52A. Therefore, even when the exterior cover 4 is folded in the reverse direction and the vicinity of the bending portion 52A is pressed in the front-rear direction, a bending load is unlikely to be applied to the bending portion 52A, and it is possible to inhibit breakage, disconnection and the like of the harness 50.

As explained above, when the folding portion 4C of the exterior cover 4 is folded in the reverse direction, at least one of the first arrangement portion 47A and the second arrangement portion 80A disposed between the intermediate portion 52 of the harness 50 and the folding portion 4C supports the harness 50 on the curved inner surface side. Therefore, the first arrangement portion 47A or the second arrangement portion 80A can increase the radius of curvature R8 of the curve of the harness 50, in comparison to the case in which the first arrangement portion 47A and the second arrangement portion 80A are not provided. It is thus possible to protect the harness 50 from breakage, disconnection of a conductive path and the like.

Further, by extending the first arrangement portion 47A and the second arrangement portion 80A respectively from the right cover 4R side and the left cover 4L side, even when the positional relationship between the first arrangement portion 47A and the second arrangement portion 80A changes in accordance with the bending of the folding portion 4C, the first arrangement portion 47A and the second arrangement portion 80A can maintain the state in which they are disposed between the intermediate portion 52 and the folding portion 4C. When the folding portion 4C of the exterior cover 4 is folded in the reverse direction, at least one of the first arrangement portion 47A and the second arrangement portion 80A is disposed between the bending portion 52A of the harness 50 and the folding portion 4C, and supports the harness 50 on the curved inner surface side. Therefore, at least one of the first arrangement portion 47A and the second arrangement portion 80A can increase the radius of curvature R8 of the curve at the bending portion 52A of the harness 50, in comparison to the case in which the first arrangement portion 47A and the second arrangement portion 80A are not provided. It is thus possible to protect the harness 50 from breakage, disconnection of a conductive path and the like.

Further, regardless of the bending direction of the folding portion 4C, the first arrangement portion 47A and the second arrangement portion 80A are disposed such that they are overlapped between the bending portion 52A and the folding portion 4C. In other words, even when the positional relationship between the first arrangement portion 47A and the second arrangement portion 80A changes in accordance with the bending of the folding portion 4C, it is possible to maintain the state in which the first arrangement portion 47A and the second arrangement portion 80A are overlapped between the bending portion 52A and the folding portion 4C. As a result, when the folding portion 4C of the exterior cover 4 is folded in the reverse direction, the first arrangement portion 47A and the second arrangement portion 80A can doubly support the harness 50 on the curved inner surface side. Therefore, the first arrangement portion 47A and the second arrangement portion 80A can increase the radius of curvature R8 of the curve at the bending portion 52A of the harness 50, in comparison to the case in which the first arrangement portion 47A and the second arrangement portion 80A are not provided. It is thus possible to protect the harness 50 from breakage, disconnection of a conductive path and the like.

When a twist is generated between the right cover 4R and the left cover 4L with the folding portion 4C being interposed therebetween, there is a possibility that the first arrangement portion 47A and the second arrangement portion 80A become misaligned in the up-down direction. One of the first arrangement portion 47A and the second arrangement portion 80A is longer than the other in the up-down direction. Therefore, even when a twist is generated, the first arrangement portion 47A and the second arrangement portion 80A are maintained such that they are overlapped with each other between the folding portion 4C and the bending portion 52A of the harness 50, and a gap is not generated in the left-right direction. Therefore, when the folding portion 4C of the exterior cover 4 is folded in the reverse direction, the first arrangement portion 47A and the second arrangement portion 80A can doubly support the harness 50 on the curved inner surface side. Therefore, the first arrangement portion 47A and the second arrangement portion 80A can increase the radius of curvature R8 of the curve at the bending portion 52A of the harness 50, in comparison to the case in which the first arrangement portion 47A and the second arrangement portion 80A are not provided. It is thus possible to protect the harness 50 from breakage, disconnection of a conductive path and the like.

Further, the first arrangement portion 47A of the first protective sheet 47 is longer than the extending portion 51B of the harness 50 in the up-down direction. Therefore, even when a twist is generated between the right cover 4R and the left cover 4L with the folding portion 4C being interposed therebetween and the extending portion 51B protrudes to the folding portion 4C side, the first arrangement portion 47A can be disposed between the extending portion 51B and the folding portion 4C. Therefore, when the folding portion 4C of the exterior cover 4 is folded in the reverse direction, the first arrangement portion 47A can support the extending portion 51B on the curved inner surface side, and it is possible to protect the extending portion 51B from breakage, disconnection of a conductive path and the like.

Further, on a path through which static electricity entering from the outside of the exterior cover 4 into the inside through the folding portion 4C moves toward the harness 50, the first arrangement portion 47A and the second arrangement portion 80A can secure a creepage distance that diverts the static electricity. It is thus possible to protect the harness 50 from the static electricity.

Further, by providing the first protective sheet 47 as a part of the fixing sheet 41R, it is possible to reduce the number of components and it is possible to easily assemble the information input device 1. Further, the first protective sheet 47 can be reliably fixed to the right cover 4R.

When a twist is generated between the right cover 4R and the left cover 4L with the folding portion 4C being interposed therebetween, there is a possibility that the intermediate portion 52 of the harness 50 is misaligned with respect to the folding portion 4C. In this case, the left-side connecting portion 53 that connects to the intermediate portion 52 and the holder 60 that covers the left-side connecting portion 53 move in accordance with the misalignment of the intermediate portion 52. Therefore, the second protective sheet 80 moves in accordance with the misalignment of the intermediate portion 52, together with the holder 60. Thus, even when the intermediate portion 52 is misaligned with respect to the folding portion 4C, it is possible to maintain the state in which the second arrangement portion 80A is disposed between the intermediate portion 52 and the folding portion 4C, and it is possible to protect the harness 50 from breakage, disconnection of a conductive path and the like.

Further, when the folding portion 4C is folded in the reverse direction, the band-shaped body 44 can cover and hide the harness 50. When the folding portion 4C is folded in the normal direction, the band-shaped body 44 can retain the harness 50 such that the harness 50 can bend along the curved inner surface of the folding portion 4C, and can guide the bending direction.

Various modifications are possible to the above-described embodiment. The detection devices 2L and 2R detect the position of the electronic pen 6 using a known electromagnetic induction method. However, a resistive membrane method (a so-called pressure sensitive method), an electric capacitance method or another method may be used to detect the approach or contact of a detection target with the detection devices 2L and 2R. The size, format and material etc. of the notebook 5 and the report pad 3 are not limited to those of the above-described embodiment. The method for mounting the notebook 5 and the report pad 3 on the detection devices 2L and 2R is not limited to the method exemplified in the above-described embodiment.

The above-described embodiment shows an example in which the first protective sheet 47 is a section of the fixing sheet 41R and is formed integrally with the mounting sheet 46. The first protective sheet 47 may be a separate body from the mounting sheet 46. Further, it is sufficient if the length L2 in the up-down direction of the first protective sheet 47 is at least longer than the length L1 in the up-down direction of the intermediate portion 52 of the harness 50. For example, the length L2 in the up-down direction of the first protective sheet 47 may be shorter than the length L5 in the up-down direction of the extending portion 51B. One of the first protective sheet 47 and the second protective sheet 80 may be provided on the exterior cover 4. The first arrangement portion 47A of the first protective sheet 47 is disposed to the rear of the second arrangement portion 80A of the second protective sheet 80, that is the first arrangement portion 47A is disposed on the folding portion 4C side. However, it may be disposed to the front of the second arrangement portion 80A. In other words, the first arrangement portion 47A may be disposed on the band-shaped body 44 side.

The first protective sheet 47 and the second protective sheet 80 are not limited to a transparent soft polyvinyl chloride sheet, and it is sufficient if they are formed of a flexible material.

What is claimed is:

1. An information input device that is capable of acquiring information that is input using a writing tool on a booklet-like recording medium in which a pair of cover sheets and a plurality of paper sheets that are stacked and arranged between the pair of cover sheets are bound at a part of respective edge portions thereof, the information input device comprising:
    a first detection device that has a first detection surface and a first circuit portion and that is a plate-shaped body capable of detecting a position of the writing tool that approaches the first detection surface, the first detection device being capable of being arranged to face an entire surface of a first cover sheet of the pair of cover sheets;
    a second detection device that has a second detection surface and a second circuit portion and that is a plate-shaped body capable of detecting a position of the writing tool that approaches the second detection surface, the second detection device being capable of being arranged to face an entire surface of a second cover sheet of the pair of cover sheets;
    a coupling member that couples the first detection device and the second detection device, and includes
        a fixing portion that is arranged to face a first back surface and fixes the first detection device, the first back surface being a surface on an opposite side to the first detection surface of the first detection device,
        a holding portion that is arranged to face a second back surface and that holds the second detection device such that the second detection device is capable of moving in a direction in which the second detection device approaches the first detection device and in a direction in which the second detection device separates from the first detection device, the second back surface being a surface on an opposite side to the second detection surface of the second detection device, and
        a folding portion that couples the fixing portion and the holding portion and that is capable of being folded in one direction and another direction, the one direction being a direction in which the first detection surface and the second detection surface face each other, and the other direction being a direction in which the first back surface and the second back surface face each other;
    a connecting line that includes a plurality of conductive paths formed on a flexible insulating film, and that electrically connects the first circuit portion and the second circuit portion, the connecting line including
        a first connecting portion which includes a first terminal portion that electrically connects to the first circuit portion, and at least a part of which is disposed between the first back surface and the fixing portion,
        an intermediate portion which connects to the first connecting portion, and at least a part of which extends between the first detection device and the second detection device and is arranged to face the folding portion, and
        a second connecting portion which connects to the intermediate portion and which includes a second terminal portion that electrically connects to the second circuit portion, at least a part of the second connecting portion being disposed between the second back surface and the holding portion; and
    a protective member which is a flexible sheet-like member and an end portion of which is fixed to at least one of the fixing portion and the holding portion of the coupling member, the protective member having an arrangement portion whose length is longer than a length of the intermediate portion in a second direction that intersects a first direction in which the intermediate portion extends between the first detection device and the second detection device, the arrangement portion being disposed between the folding portion and the intermediate portion of the connecting line.

2. The information input device according to claim 1, wherein
    the protective member includes
        a first protective member whose end portion is fixed to the fixing portion of the coupling member, and which has a first arrangement portion that is disposed between the folding portion and the intermediate portion of the connecting line, and
        a second protective member whose end portion is fixed to the holding portion of the coupling member, and which has a second arrangement portion that is disposed between the folding portion and the intermediate portion of the connecting line, and
    at least one of the first arrangement portion and the second arrangement portion is disposed between a bending portion, which is a section of the intermediate portion, and the folding portion, the bending portion being a section that bends in accordance with bending of the folding portion.

3. The information input device according to claim 2, wherein
regardless of a bending direction of the folding portion of the coupling member, the first arrangement portion and the second arrangement portion of the protective member are overlapped with each other in a thickness direction and arranged between the folding portion and the bending portion of the connecting line.

4. The information input device according to claim 3, wherein
in the second direction, a length of one of the first arrangement portion and the second arrangement portion of the protective member is longer than a length of the other.

5. The information input device according to claim 4, wherein
the first connecting portion of the connecting line includes an extending portion that extends in the second direction between the first terminal portion and the intermediate portion, and
in the second direction, the length of the first arrangement portion of the protective member is longer than the length of the second arrangement portion, and is longer than a length of the extending portion.

6. The information input device according to claim 5, wherein
in the second direction, end portions on both sides of the first arrangement portion are respectively positioned outside of and at least 10 millimeters away from end portions on both sides of the extending portion.

7. The information input device according to claim 2, wherein
in the second direction, end portions on both sides of the second arrangement portion are respectively positioned outside of and at least 10 millimeters away from end portions on both sides of the intermediate portion.

8. The information input device according to claim 2, wherein
the fixing portion of the coupling member includes a sheet-like fixing member that fixes the first detection device, and
the first protective member is a section of the fixing member.

9. The information input device according to claim 2, further comprising:
a first covering member that is fixed to the holding portion of the coupling member, and that covers at least a part of a section of the second connecting portion disposed between the second back surface of the second detection device and the holding portion; and
a support portion that is provided on the second detection device and that supports the first covering member such that the first covering member is capable of moving in the first direction along the second back surface;
wherein
the second protective member is fixed to the first covering member.

10. The information input device according to claim 2, wherein p1 the coupling member includes a second covering member that covers the intermediate portion of the connecting line, the first arrangement portion of the first protective member and the second arrangement portion of the second protective member that are sandwiched between the second covering member and the folding portion.

* * * * *

UNITED STATES PATENT AND TRADEMARK OFFICE
CERTIFICATE OF CORRECTION

PATENT NO. : 9,619,726 B2  
APPLICATION NO. : 14/807980  
DATED : April 11, 2017  
INVENTOR(S) : Takehiko Inaba et al.

Page 1 of 1

It is certified that error appears in the above-identified patent and that said Letters Patent is hereby corrected as shown below:

In the Claims

In Column 20, Claim 10, Line 28:
Please delete "p1 the coupling member" and insert --¶ the coupling member--

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*